US006444246B1

(12) United States Patent
Popplewell et al.

(10) Patent No.: US 6,444,246 B1
(45) Date of Patent: *Sep. 3, 2002

(54) CAKE-RESISTANT, HYGROSCOPICALLY SENSITIVE MATERIALS AND PROCESS FOR PRODUCING THE SAME

(75) Inventors: Lewis M. Popplewell, Cockeysville, MD (US); J. Mark Black, Bel Air, MD (US); Michael G. Madsen, Baltimore, MD (US)

(73) Assignee: McCormick & Company, Inc., Sparks, MD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,415

(22) Filed: Dec. 16, 1998

Related U.S. Application Data

(60) Provisional application No. 60/069,707, filed on Dec. 16, 1997.

(51) Int. Cl.$^7$ .......................... A23B 4/10; A23L 1/2165; A23L 1/224
(52) U.S. Cl. .......................... 426/321; 426/62; 426/96; 426/102; 426/453; 426/454; 426/465; 426/471; 426/516; 426/518; 426/573; 426/615; 426/638; 426/640; 426/650; 426/656; 426/658; 426/661; 426/662
(58) Field of Search ................................. 426/453, 454, 426/464, 465, 471, 650, 516, 518, 615, 573, 638, 640, 62, 658, 661, 662, 321, 96, 102, 656

(56) References Cited

U.S. PATENT DOCUMENTS

| 1,696,419 A | 12/1928 | Staudinger et al. |
| 2,156,212 A | 4/1939 | Wendt et al. |
| 2,306,061 A | 12/1942 | Johnston |

(List continued on next page.)

FOREIGN PATENT DOCUMENTS

| EP | 0 010 804 | 5/1980 |
| EP | 0 028 043 | 5/1981 |
| EP | 0 041 370 | 12/1981 |
| EP | 0 144 758 | 6/1985 |
| EP | 0 158 460 | 10/1985 |
| EP | 0 201 968 | 11/1986 |
| EP | 0 213 247 | 3/1987 |
| EP | 0 353 806 | 2/1990 |
| EP | 0 354 810 | 2/1990 |
| GB | 1 249 250 | 10/1971 |
| GB | 1538958 | 1/1979 |
| GB | 2 063 640 | 6/1981 |
| IL | 43 506 | 9/1976 |
| WO | 93/19622 | 10/1993 |
| WO | 94/06308 | 3/1994 |
| WO | 94/23593 | 10/1994 |
| WO | 96/07333 | 3/1996 |

OTHER PUBLICATIONS

S. R. Noar, *Dissertation Abstracts Int.*, B, vol. 46(9) 2893 (1986) order No. DA8525804 (Abstract only).
J.P. Dumont et al, *J. Agric. Food Chem.*, vol. 34, pp. 1041–1045 (1986) (Abstract only).
E. Jasinksi et al, *Milchwissenschaft*, vol. 40, pp. 596–599 (1985) (Abstract only).
O.E. Mills et al, *Lebensm.–Wiss.*, vol. 17, pp. 331–335 (1984) (Abstract only).
S. Arai et al, *Agricultural and Biological Chemistry*, vol. 34, pp. 1569–1573 (1970) (Abstract only).
*Kirk–Othmer, Encyclopedia of Chemical Technology*, 3rd Ed., Wiley, New York, vol. 11, pp. 490–498 (1980).
*Kirk–Othmer Encyclopedia of Chemical Technology*, 3rd Ed., Wiley, New York, vol. 11, pp. 146–163 (1980).
Levine et al., "Glass transitions in Foods", pp. 83–221 in *Physical Chemistry of Foods*, H. Schwartzberg and R. Hartel, Eds., Marciel Dekker, New York 1992.
Levine et al., "Water as a Plasticizer: physico–chemical aspects of low–moisture polymeric systems", pp. 79–185 in *Water Science Reviews*, vol. 3, Franks ed., Cambridge University Press, London 1988.
H. Heath, *Source Book of Flavors*, Avi Publishing Co., Westport, CT, 1981, pp. 148–287.
Roos et al., *J. Food Science*, vol. 56, No. 6, pp. 1676–1681, (1991).
S. L. Young et al., *J. Dairy Science.*, vol. 76, pp. 2868–2877 (1993).
*Kirk–Othmer, Encyclopedia of Chemical Technology*, 4$^{th}$, Wiley, New York, vol. 3, pp. 876–892 (1992).
*Kirk–Othmer, Encyclopedia of Chemical Technology*, 3$^{rd}$ Ed., Wiley, New York, vol. 15, pp. 522–570 (1981).
J. A. Maga, et al., *Dev. Food Sci.*, vol. 29, pp. 519–525 (1992).
A.P. Hansen et al., *J. Dairy Sci.*, vol. 74, pp. 2936–2940 (1991).
S. L. Young et al, *J. Dairy Sci.*, vol. 76, pp. 2878–2885 (1993).
P. K. W. Ng et al, *Journal of Food Sci.*, vol. 54, pp. 105–107 (1989).
T. E. O'Neill et al, *J. Agric. Food Chem.*, vol. 35, pp. 770–774 (1987).
A.P. Hansen et al, *ACS Symposium Series: Barrier Polymer Structure*, ACS, Washington, DC, Chapter 17, pp. 318–332 (1990).

(List continued on next page.)

*Primary Examiner*—Helen Pratt
(74) *Attorney, Agent, or Firm*—Oblon, Spivak, McClelland, Maier & Neustadt, P.C.

(57) ABSTRACT

The resistance to caking of normally hygroscopic materials, such as spray-dried hydrolyzed vegetable protein, upon exposure to high humidity conditions may be improved by increasing the average minimum dimension of the hygroscopic material and a carrier material to 125 to 2,000 microns.

39 Claims, No Drawings

U.S. PATENT DOCUMENTS

| | | | |
|---|---|---|---|
| 2,809,895 A | | 10/1957 | Swisher |
| 2,819,971 A | * | 1/1958 | Gunthardt .................. 426/662 |
| 2,856,291 A | | 10/1958 | Schultz |
| 2,857,281 A | | 10/1958 | Schultz et al. |
| 2,919,989 A | | 1/1960 | Schultz |
| 3,021,218 A | | 2/1962 | Clinton et al. |
| 3,041,180 A | | 6/1962 | Swisher |
| 3,314,803 A | | 4/1967 | Dame et al. |
| 3,410,180 A | | 11/1968 | Spangler et al. |
| 3,532,515 A | | 10/1970 | Broderick et al. |
| 3,625,709 A | | 12/1971 | Mitchell |
| 3,655,397 A | | 4/1972 | Parliment et al. |
| 3,704,137 A | | 11/1972 | Beck |
| 3,769,038 A | * | 10/1973 | Mitchell et al. ............ 426/638 |
| 3,783,163 A | | 1/1974 | Patel |
| 3,821,447 A | | 6/1974 | Jasovsky et al. |
| 3,823,241 A | | 7/1974 | Patel et al. |
| 3,840,672 A | * | 10/1974 | Kasik et al. ................ 426/638 |
| 3,852,481 A | | 12/1974 | Feldman et al. |
| 3,857,964 A | | 12/1974 | Yolles |
| 3,873,746 A | | 3/1975 | Mahlmann |
| 3,922,354 A | | 11/1975 | Galuzzi et al. |
| 3,922,375 A | | 11/1975 | Dalan et al. |
| 3,939,291 A | | 2/1976 | Katz |
| 3,970,765 A | | 7/1976 | Pitchon et al. |
| 3,970,766 A | | 7/1976 | Mitchell et al. |
| 3,971,852 A | | 7/1976 | Brenner et al. |
| 3,979,528 A | | 9/1976 | Mahlmann |
| 3,985,910 A | | 10/1976 | Kirkpatrick |
| 3,989,852 A | | 11/1976 | Palmer |
| 3,991,223 A | | 11/1976 | Baron et al. |
| 4,004,039 A | | 1/1977 | Shoaf et al. |
| 4,007,291 A | | 2/1977 | Siedlecki et al. |
| 4,008,340 A | | 2/1977 | Kung et al. |
| 4,044,167 A | | 8/1977 | Jolly et al. |
| 4,119,736 A | | 10/1978 | Howland et al. |
| 4,230,687 A | | 10/1980 | Sair et al. |
| 4,232,047 A | | 11/1980 | Sair et al. |
| 4,289,794 A | | 9/1981 | Kleiner et al. |
| 4,318,932 A | * | 3/1982 | Ewing et al. ............... 426/662 |
| 4,335,149 A | | 6/1982 | Stipp |
| 4,378,380 A | | 3/1983 | Scarpellino et al. |
| 4,388,328 A | | 6/1983 | Glass |
| 4,398,422 A | | 8/1983 | Haerten |
| 4,508,745 A | | 4/1985 | Fulger et al. |
| 4,520,033 A | | 5/1985 | Tuot |
| 4,532,145 A | | 7/1985 | Saleeb et al. |
| 4,547,377 A | | 10/1985 | Ogawa et al. |
| 4,551,345 A | | 11/1985 | Davidescu et al. |
| 4,556,575 A | | 12/1985 | Katz et al. |
| 4,574,089 A | | 3/1986 | Musto et al. |
| 4,608,340 A | | 8/1986 | Szajani et al. |
| 4,610,890 A | | 9/1986 | Miller et al. |
| 4,659,390 A | | 4/1987 | Zeller et al. |
| 4,678,516 A | | 7/1987 | Alderman et al. |
| 4,689,235 A | | 8/1987 | Barnes et al. |
| 4,690,825 A | | 9/1987 | Won |
| 4,698,264 A | | 10/1987 | Steinke |
| 4,707,367 A | | 11/1987 | Miller et al. |
| 4,738,724 A | | 4/1988 | Wittwer et al. |
| 4,820,534 A | | 4/1989 | Saleeb et al. |
| 4,820,634 A | | 4/1989 | Watanabe |
| 4,879,130 A | | 11/1989 | Heyland et al. |
| 4,919,962 A | | 4/1990 | Arora et al. |
| 4,973,486 A | * | 11/1990 | Matsumoto et al. ........ 426/638 |
| 4,999,208 A | | 3/1991 | Lengerich et al. |
| 5,009,900 A | | 4/1991 | Levine et al. |
| 5,035,908 A | | 7/1991 | Arora et al. |
| 5,079,026 A | | 1/1992 | Arora et al. |
| 5,087,461 A | | 2/1992 | Levine et al. |
| 5,098,893 A | | 3/1992 | Franks et al. |
| 5,124,162 A | | 6/1992 | Boskovic et al. |
| 5,266,335 A | | 11/1993 | Cherukuri et al. |
| 5,354,559 A | | 10/1994 | Morehouse |
| 5,370,881 A | | 12/1994 | Fuisz |
| 5,399,368 A | | 3/1995 | Garwood et al. |
| 5,401,518 A | | 3/1995 | Adams et al. |
| 5,536,513 A | | 7/1996 | Graf et al. |
| 5,601,760 A | | 2/1997 | Rosenberg |
| 5,601,865 A | * | 2/1997 | Fulger et al. ............... 426/650 |
| 5,603,971 A | | 2/1997 | Porzio et al. |
| 5,750,178 A | | 5/1998 | Cheng et al. |
| 5,756,136 A | | 5/1998 | Black et al. |
| 5,792,505 A | | 8/1998 | Fulger et al. |
| 5,897,897 A | | 4/1999 | Porzio et al. |
| 5,935,635 A | * | 8/1999 | Mori et al. ................. 426/656 |
| 5,958,502 A | | 9/1999 | Fulger et al. |
| 6,090,419 A | | 7/2000 | Popplewell et al. |

OTHER PUBLICATIONS

T. E. O'Neill et al, *Journal of Food Sci.*, vol. 52, pp. 98–101 (1987).

D. L. Moreau et al, *Food Structure*, vol. 12, pp. 457–468, (1993) (Abstract only).

T. E. O'Neill et al, *J. Food Sci.*, vol. 53, pp. 906–909 (1988) (Abstract only).

* cited by examiner

CAKE-RESISTANT, HYGROSCOPICALLY SENSITIVE MATERIALS AND PROCESS FOR PRODUCING THE SAME

This application claims the benefit of U.S. provisional application No. 60/069,707, filed Dec. 16, 1997.

BACKGROUND OF THE INVENTION

1. Field of the Invention

The present invention relates to cake-resistant products which comprises materials which are normally hygroscopically sensitive. The present invention also relates to a process for preparing such materials.

2. Discussion of the Background

Dried, flowable food ingredients such as hydrolyzed vegetable proteins, autolyzed yeast extracts, and tomato powders have long been used in the food industry for their contribution to flavor in finished products. However, these products tend to be extremely sensitive to ambient humidity. As a result, such products tend to absorb moisture and cake. They also tend to absorb moisture when combined with components with a higher moisture content, which can also lead to caking.

Caking is a problem, because it impairs the flowability of the product, which leads to production problems. The caking of such products tends not to be reversible and, thus, renders the products unusable.

Suppliers of these ingredients have attempted to alleviate the problem of caking by adding an edible oil such as cottonseed oil or other vegetable oil or a polyoxyethylene sorbitan monoester to the products to reduce the propensity of the product to absorb moisture.

However, such oil-containing products still tend to cake when exposed to high humidity conditions.

U.K. 1,538,958 discloses the addition of silica and an edible oil to hydrolyzed protein to prepare a dust-free and free-flowing product. However, the addition of oil is undesirable, because non-water-soluble components can contribute oxidative off flavors, increase caloric intensity, and cause oiling off of the product in the final application.

Thus, there remains a need for products which contain a hygroscopically sensitive material but are resistant to caking. There also remains a need for a process for preparing such a product.

SUMMARY OF THE INVENTION

Accordingly, it is one object of the present invention to provide a product which comprises a hygroscopically sensitive material but exhibits a high resistance to caking.

It is another object of the present invention to provide a product which comprises a hygroscopically sensitive material but exhibits a high resistance to caking when exposed to high humidity conditions.

It is another object of the present invention to provide a product which comprises a hygroscopically sensitive food ingredient but exhibits a high resistance to caking when exposed to high humidity conditions.

It is another object of the present invention to provide a product which comprises a hydrolyzed vegetable protein but exhibits a high resistance to caking when exposed to high humidity conditions.

It is another object of the present invention to provide a process for producing such a product.

These and other objects, which will become apparent during the following detailed description, have been achieved by the inventors' discovery that the hygroscopic nature of many food ingredients, such as hydrolyzed vegetable proteins, is due in large part to the presence of fine particles (i.e., particles with small average particle size) in the material. The presence of fine particles in such materials is, in turn, the result of the manufacturing processes used to prepare such materials. Food ingredients such as hydrolyzed vegetable proteins are typically prepared by spray drying which results in the material containing very small particles (e.g., average particle size of 30 to 150 microns). Thus, the inventors have discovered that it is possible to reduce a normally hygroscopically sensitive material's tendency to cake in the presence of high humidity conditions by mixing with a carrier material and increasing the average minimum dimension of the material to at least 125 to 2,000 microns, preferably 250 to 1,200 microns.

Thus, in a first embodiment, the present invention provides a product which comprises a material which is hygroscopically sensitive and a carrier material and has an average minimum dimension of 125 to 2,000 microns, preferably 250 to 1,200 microns.

In a preferred embodiment, the average minimum dimension of the product comprising a hygroscopically sensitive material and a carrier is increased by milling an extruded product. Thus, the present invention also provides a process for producing a product which contains a hygroscopically sensitive material but is resistant to caking, comprising:

(i) forming a melt comprising a hygroscopically sensitive material and a carrier;

(ii) extruding the melt, to obtain an extruded product;

(iii) milling the extruded product to obtain a milled product with an average minimum dimension of 125 to 2,000 microns, preferably 250 to 1,200 microns.

Alternative methods for increasing the average minimum dimension of the hygroscopically sensitive material include pressure compaction, granulation, and fat agglomeration.

DETAILED DESCRIPTION OF THE PREFERRED EMBODIMENTS

Thus, in a first embodiment, the present invention provides products which comprises a hygroscopically sensitive material and a carrier material but are resistant to caking. Preferably, the hygroscopically sensitive material is a food ingredient.

Examples of hygroscopically sensitive food ingredients which may be included in the present products include hydrolyzed vegetable proteins, such as hydrolyzed soy protein, hydrolyzed corn protein, and hydrolyzed wheat protein; spray-dried soy sauce; tomato powder; onion powder; garlic powder; other natural vegetable powders which are high in carbohydrates; autolyzed yeast extracts; and spray-dried syrups. Most preferably, the hygroscopically sensitive material is a hydrolyzed vegetable protein.

Within the context of the present invention, a material is hygroscopically sensitive if it absorbs and retains moisture under defined relative humidity and temperature conditions, such as 75% relative humidity at 90° F.

The present product comprising the hygroscopically sensitive material and carrier material has an average minimum dimension of 125 to 2,000 microns, preferably 250 to 1,200 microns, more preferably 400 to 1,200 microns. The average minimum dimension may be measured using Official ASTA Analytical Method 10.0, American Spice Trade Association Official Methods, 1997, Englewood Cliffs, N.J. 07632.

In a preferred embodiment, the present product may further comprise additional components such as a flow agent such as calcium stearate and silica (including micronized silicon dioxide, sodium silicate,: potassium silicate, and sodium silicoaluminate-treated (hydrophobized) silica).

Typically, the present product will comprise the hygroscopically sensitive material in an amount of 50 to 99.9% by weight, preferably 80 to 99% by weight, more preferably 80 to 95% by weight, based on the total weight of the product. When the present product contains a flow agent, the flow agent will typically be present in an amount of 0.1 to 10% by weight, preferably 0.1 to 5% by weight, more preferably 0.1 to 2% by weight, based on the total weight of the product.

Typically the product comprises from 0.1 to 50 weight %, preferably from 1 to 20 weight %, more preferably from 5 to 10 weight %, of the carrier material, based on the total weight of the product.

The cake-resistant product according to the present invention offers retained flowability under conditions where caking typically occur. Flowability is the ability of a powder or particulate to move in mass under a defined application of force.

Certain methods for preparing the present product, including milling of an extruded product, employ a carrier material, such as a proteinaceous or sugar type carrier. Mixtures of carrier materials are provided for. Examples of suitable carrier materials include any viscosity building agent, e.g., modified and native maltodextrins of corn, wheat, potato, barley, paselli, and other grains such as, PRIMACEL™, i.e. microfibrous cellulose, wheat gluten and lactose; structural proteins such as gelatin; modified and native starches of corn, wheat, potato, barley, and other grains; gums and exudates such as tragacanth, xanthan, algin, carrageenan, ghatti, arabic, and pectins. Preferred carrier materials are gum arabic, paselli maltodextrin, primacel cellulose and a mixture thereof.

In a preferred embodiment, the cake-resistant product does not contain an edible oil such as cotton seed oil, vegetable oil, or a polyethylene sorbitan monoester. In this context, the cake-resistant product is considered not to contain an edible oil if the content of edible oil is $\leq 10$ wt. %, preferably $\leq 5$ wt. %, more preferably $\leq 1$ wt. %, even more preferably $\leq 0.5$ wt. % and even more preferably $\leq 0.1$ wt. % and even more preferably 0 wt. %.

In another embodiment, the present invention provides a method of reducing the tendency of a hygroscopically sensitive material to cake by increasing the average minimum dimension of the hygroscopically sensitive material to 125 to 2,000 microns, preferably 250 to 1,200 microns, more preferably 400 to 1,200 microns. Typically, the starting material used in the process for producing the present product will be a hygroscopically sensitive material which has been produced by spray drying and, thus, has an average particle size of 30 to 150.

Any method of increasing:the average minimum dimension of the hygroscopically sensitive material and carrier material may be used so long as the method does not have a deleterious effect on the hygroscopically sensitive material. Specific examples of methods which may be used to increase the average minimum dimension of the hygroscopically sensitive material include milling an extruded product, pressure compaction, granulation, and fat agglomeration.

In a preferred embodiment, the present product is prepared by a process comprising:
 (i) forming a melt comprising a hygroscopically sensitive material and a carrier material;
 (ii) extruding the melt, to obtain an extruded product;
 (iii) milling the extruded product to obtain a milled product with an average minimum dimension of 125 to 2,000 microns, preferably 250 to 1,200 microns.

The formation of products by melt extrusion is described in detail in, e.g., U.S. Pat. Nos. 5,601,865; 5,603,971; 5,792,505; 5,897,897; and 6,090,419, all of which are incorporated herein by reference in their entirety.

Examples of the carrier material to be used in the present process are the same as those described above in the context of the present product. Typically the melt comprises from 50 to 99.9 weight %, preferably from 80 to 99 weight %, more preferably from 90 to 95 weight %, of the hygroscopically sensitive material and from 0.1 to 50 weight %, preferably from 1 to 20 weight %, more preferably from 5 to 10 weight %, of the carrier material, based on the total weight of the melt.

The milling of the extruded product may be carried out by means of any suitable device. Examples of suitable devices for milling the extruded product include hammer mills, roller mills, and rotary mills.

In a particularly preferred embodiment, the milled product is coated with a flow agent. Suitable flow agents are the same as those listed above in the context of the present product. The milled agent may be coated with the flow agent by means of any suitable device. Examples of suitable devices for coating the milled product with the flow agent include rotary drums and ribbon blenders. Alternatively, the flow agent can be added during sieving of the milled product. Typically, the milled product will be coated with the flow agent in an amount of 0.1 to 10% by weight, preferably 0.1 to 5% by weight, more preferably 0.1 to 2% by weight, based on the total weight of the milled product and the flow agent.

The present product will typically be stored and shipped in a moisture-proof package. An example of a typical package is a 4 mil polyethylene-lined kraft paper bag or a polyethylene bag contained in a cardboard box.

Having generally described this invention, a further understanding can be obtained by reference to certain specific examples which are provided herein for purposes of illustration only and are not intended to be limiting unless otherwise specified.

EXAMPLES

Example 1

4,500 Grams of hydrolyzed vegetable protein (4BE, Fidco, Inc., Cleveland, Ohio) was blended with 500 grams of gum arabic (SprayGum C, Colloids Naturels International, Paris, France). The blended material was melted in an extruder at 180° F. and formed into 0.0625" diameter strands. The strands were cooled to ambient temperature and milled into granular form using a 192 Comil (Quadro, Inc.) Equipped with a 0.079" hole grating screen. The milled material was sieved to remove product smaller than 180 microns using a rotary sifter (Sweco, Inc.). The sieved product was coated with 2% by weight calcium stearate.

Example 2

The following blends were extruded and milled into particulates of similar size (−16/+80 mesh), coated with calcium. stearate in an amount of 2 wt.%, and then exposed to 75% relative humidity at 90° F. The samples were evaluated for caking at intervals as indicated.

| | Hydrolyzed Vegetable Protein | Carrier | | | Caking | | | | |
|---|---|---|---|---|---|---|---|---|---|
| | HVP 4BE | Gum Arabic | Paselli Maltodextrin | Primacel Cellulose | 1 h | 2 h | 3 h | 4 h | 14 h |
| Example 2A | 90 | 10 | 0 | 0 | | | | | yes |
| Example 2B | 90 | 0 | 10 | 0 | | yes | | | |
| Example 2C | 90 | 0 | 0 | 10 | | | | | yes |
| Comparative Example | 100 | | | | yes | | | | |

While the hydrolyzed vegetable protein alone exhibited caking after only 1 h, each of the examples according to the present invention exhibited a resistance to caking, greater than the hydrolyzed vegetable protein alone. Moreover, even with a small portion of carrier, the selection of the specific agent can result in an even greater increase in resistance to caking.

Example 3

The following blends were extruded and milled into particulates of similar size (−16/+80 mesh), coated with calcium stearate in an amount of 2 wt. %, and then exposed to 75% relative humidity at 90° F. The samples were evaluated for caking at intervals as indicated.

| | Hydrolyzed Vegetable Protein | Carrier | | | Caking | | | |
|---|---|---|---|---|---|---|---|---|
| | HVP 3H3 | Gum Arabic | Wheat Gluten | Lactose | 1 h | 2 h | 3 h | 4 h |
| Example 3A | 90 | 10 | 0 | 0 | | | | yes |
| Example 3B | 90 | 5 | 5 | 0 | | yes | | |
| Example 3C | 85 | 5 | 0 | 10 | | yes | | |
| Comparative Example | 100 | | | | yes | | | |

While the hydrolyzed vegetable protein alone exhibited caking after only 1 h, each of the examples according to the present invention exhibited a resistance to caking, greater than the hydrolyzed vegetable protein alone. The effectiveness of mixed carrier is demonstrated.

The present process affords a product which exhibits a high resistance to caking. Furthermore, while the products are not prevented from absorbing moisture and do tend to soften upon prolonged exposure to high humidity, their resistance to caking permits them to recover from exposure to high humidity once they are removed from the humid environment. This permits the products to be used in a fashion in which: (i) a portion of the product is removed from a container and used on a first date, whereby the portion of the product remaining in the container is exposed to high humidity conditions; and (ii) then the remainder of the product from the same container is used at a later date.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A product, comprising:
   (1) a hygroscopically sensitive material;
   (2) a carrier material; and
   (3) a flow agent,
   wherein said product has an average minimum dimension of 125 to 2,000 microns,
   wherein said hygroscopically sensitive material is selected from the group consisting of hydrolyzed vegetable proteins, spray-dried soy sauce, tomato powder, onion powder, garlic powder, other natural vegetable powders which are high in carbohydrates, autolyzed yeast extracts, and spray-dried syrups,
   wherein said carrier material is selected from the group consisting of modified and native maltodextrins of corn, wheat, potato, barley, paselli, and other grains; microfibrous cellulose; wheat gluten; gelatin; modified and native starches of corn, wheat, potato, barley, and other grains; tragacanth gum; xanthan gum; algin; carrageenan; gum ghatti; gum arabic; and pectins,
   wherein said hygroscopically sensitive material is present in an amount of 50 to 99.9 weight %, based on the total weight of said product, and
   wherein said flow agent is selected from the group consisting of calcium stearate, micronized silicon dioxide, sodium silicate, potassium silicate, and sodium silicoaluminate-treated silica.

2. The product of claim 1, wherein said product has an average minimum dimension of 250 to 1,200 microns.

3. The product of claim 1, wherein said hygroscopically sensitive material is present in an amount of 80 to 99 weight %, based on the total weight of said product.

4. The product of claim 1, wherein said carrier material is present in an amount of 0.1 to 50 weight %, based on the total weight of said product.

5. The product of claim 1, wherein said carrier material is present in an amount of 1 to 20 weight %, based on the total weight of said product.

6. The product of claim 1, wherein said hygroscopically sensitive material is a hydrolyzed vegetable protein.

7. The product of claim 1, wherein said hygroscopically sensitive material has been prepared by spray drying.

8. The product of claim 1, wherein said flow agent is calcium stearate.

9. he product of claim 1, wherein said flow agent is present in an amount of 0.1 to 10 weight %, based on the total weight of said product.

10. The product of claim 1, wherein said flow agent is present in an amount of 0.1 to 2 weight %, based on the total weight of said product.

11. The product of claim 1, wherein said product comprises less than 10 weight %, based on the total weight of said product, of an edible oil.

12. The product of claim 1, wherein said product comprises less than 0.1 weight %, based on the total weight of said product, of an edible oil.

13. The product of claim 1, wherein said carrier material is selected from the group consisting of gum arabic, paselli maltodextrin, microfibrous cellulose, and mixtures thereof.

14. The product claim 1, wherein said carrier material is gum arabic.

15. The product of claim 14, wherein said product has an average minimum dimension of 250 to 1,200 microns.

16. The product of claim 14, wherein said hygroscopically sensitive material is present in an amount of 80 to 99 weight % based on the total weight of said product.

17. The product of claim 14, wherein said carrier material is present in an amount of 0.1 to 50 weight %, based on the total weight of said product.

18. The product of claim 14, wherein said carrier material is present in an amount of 1 to 20 weight based on the total weight of said product.

19. The product of claim 14, wherein said hygroscopically sensitive material has been prepared by spray drying.

20. The product of claim 14, wherein said flow agent is calcium stearate.

21. The product of claim 14, wherein said flow agent is present in an amount of 0.1 to 10 weight %, based on the total weight of said product.

22. The product of claim 14, wherein said flow agent is present in an amount of 0.1 to 2 weight %, based on the total weight of said product.

23. The product of claim 14, wherein said product comprises less than 10 weight %, based on the total weight of said product, of an edible oil.

24. The product of claim 14, wherein said product comprises less than 0.1 weight %, based on the total weight of said product, of an edible oil.

25. The product of claim 14, wherein said hygroscopically sensitive material is a hydrolyzed vegetable protein.

26. The product of claim 25, wherein said product has an average minimum dimension of 250 to 1,200 microns.

27. The product of claim 25, wherein said hygroscopically sensitive material is present in an amount of 80 to 99 weight %, based on the total weight of said product.

28. The product of claim 25, wherein said carrier material is present in an amount of 0.1 to 50 weight %, based on the total weight of said product.

29. The product of claim 25, wherein said carrier material is present in an amount of 1 to 20 weight %, based on the total weight of said product.

30. The product of claim 25, wherein said hygroscopically sensitive material has been prepared by spray drying.

31. The product of claim 25, wherein said flow agent is calcium stearate.

32. The product of claim 25, wherein said flow agent is present in an amount of 0.1 to 10 weight %, based on the total weight of said product.

33. The product of claim 25, wherein said flow agent is present in an amount of 0.1 to 2 weight %, based on the total weight of said product.

34. The product of claim 25, wherein said product comprises less than 10 weight %, based on the total weight of said product, of an edible oil.

35. The product of claim 25, wherein said product comprises less than 0.1 weight %, based on the total weight of said product, of an edible oil.

36. The product of claim 1, wherein said carrier material is selected from the group consisting of modified and native maltodextrins of corn, wheat, potato, barley, paselli, and other grains; microfibrous cellulose; wheat gluten; gelatin; modified and native starches of corn, wheat, potato, barley, and other grains; and gum arabic.

37. The product of claim 36, wherein said product has an average minimum dimension of 250 to 1,200 microns.

38. The product of claim 36, wherein said hygroscopically sensitive material is present in an amount of 80 to 99 weight %, based on the total weight of said product.

39. The product of claim 36, wherein said carrier material is present in an amount of 0.1 to 50 weight %, based on the total weight of said product.

* * * * *